(12) United States Patent  (10) Patent No.: US 8,556,326 B2
Zentner  (45) Date of Patent: Oct. 15, 2013

(54) FUEL TANK COVER MODULE

(75) Inventor: Christian Zentner, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/393,240

(22) PCT Filed: Apr. 3, 2010

(86) PCT No.: PCT/EP2010/002138
§ 371 (c)(1),
(2), (4) Date: Feb. 29, 2012

(87) PCT Pub. No.: WO2011/026532
PCT Pub. Date: Mar. 10, 2011

(65) Prior Publication Data
US 2012/0161462 A1  Jun. 28, 2012

(30) Foreign Application Priority Data
Sep. 2, 2009  (DE) .......................... 10 2009 039 810

(51) Int. Cl.
*B60K 15/05* (2006.01)
(52) U.S. Cl.
USPC ....................................... 296/97.22
(58) Field of Classification Search
USPC ................... 296/97.22; 220/86.2, DIG. 33
See application file for complete search history.

(56) References Cited

U.S. PATENT DOCUMENTS

| | | | |
|---|---|---|---|
| 5,437,491 A * | 8/1995 | Nedbal et al. | 296/97.22 |
| 5,772,062 A | 6/1998 | Gramss | |
| 6,089,644 A | 7/2000 | Mittelhaeuser et al. | |
| 7,311,348 B1 * | 12/2007 | Bang et al. | 296/97.22 |
| 8,162,375 B2 * | 4/2012 | Gurtatowski et al. | 296/97.22 |

FOREIGN PATENT DOCUMENTS

| | | |
|---|---|---|
| DE | 4327930 A1 | 2/1995 |
| DE | 19517705 A1 | 11/1996 |
| DE | 19748975 A1 | 5/1999 |
| DE | 19827194 A1 | 12/1999 |
| DE | 10026841 A1 | 12/2001 |
| DE | 102005051140 A1 | 5/2007 |
| EP | 0736406 A1 | 10/1996 |
| EP | 0760306 A1 | 3/1997 |
| EP | 1129882 A2 | 9/2001 |

OTHER PUBLICATIONS

International Searching Authority, International Search Report for Application No. PCT/EP2010/002138, dated Nov. 24, 2010.

* cited by examiner

*Primary Examiner* — Dennis Pedder
(74) *Attorney, Agent, or Firm* — Ingrassia Fisher & Lorenz, P.C.

(57) ABSTRACT

A tank flap module is provided for installation in a motor vehicle, having a recess body insertable into an opening of the vehicle body, which has a passage opening for receiving a fuel filler neck in the area of a base section, and which has a flange-like fastening edge protruding radially outward facing away from the base section. A flexibly deformable and peripheral axial sealing tab is provided extending along the fastening edge, which extends axially outward in relation to the passage opening and comes into contact on an interior of a tank flap, which is located in the closed position and is mounted so it is pivotable on the recess body.

19 Claims, 2 Drawing Sheets

FUEL TANK COVER MODULE

CROSS-REFERENCE TO RELATED APPLICATIONS

This application is a U.S. National-Stage entry under 35 U.S.C. §371 based on International Application No. PCT/EP2010/002138, filed Apr. 3, 2010, which was published under PCT Article 21(2) and which claims priority to German Application No. 10 2009 039 810.4, filed Sep. 2, 2009, which are all hereby incorporated in their entirety by reference.

TECHNICAL FIELD

The technical field relates to a tank flap module for installation in a motor vehicle, the module having a recess body, which is insertable into an opening of the vehicle body and is closable using a tank flap mounted to pivot on the recess body.

BACKGROUND

Tank flap modules for installation in motor vehicles are well known in the prior art. Thus, for example, the tank flap module described in DE 10 2005 051 140 A1 has a pot-shaped recess body, which is essentially constructed from a rigid outer pot part producible by injection molding and an elastic base skirt molded onto the pot part. Furthermore, a passage opening for a fuel filler neck of a fuel tank, which is closable using a tank lid, is provided in the base skirt. The passage opening presses against the fuel filler neck to form a seal after installation. The outer pot part and the base skirt jointly form a tank recess.

Furthermore, a tank flap filler neck pot module for motor vehicles is known from DE 100 26 841 B4, in which the wall of the filler neck pot is formed in a two-component injection-molding method from a hard component and a soft component such that, on the respective access area to an unlocking element, a soft diaphragm which allows the actuation of the unlocking element from the pot inner side is applied in the hard component.

A receptacle for a so-called push-push closure, which cooperates with a corresponding counter element on the flap carrier, is externally extrusion coated on the side wall opposite to a pivot bearing for the tank lid. Such a push-push closure is distinguished in that it is typically unlocked by pressure on the tank flap of the closure and the closure is locked again upon reinsertion of a counter element. The closure supports the opening of the tank flap over a distance of 10 mm outward, so that it is possible to reach behind a vehicle body panel and easily open the tank flap. The flap must be pressed 2 mm further inward for unlocking.

Since the flap must be pressed inward for an unlocking procedure in the way described, it is provided that the vehicle body panel or the tank flap only partially presses against a stop on the filler neck pot side. Such end stops are provided at the top and bottom on the vehicle body, for example, but never in the area of the push-push closure, since these would otherwise make an inwardly directed unlocking movement of the flap significantly more difficult.

Because the tank flap or the vehicle body panel thereof only regionally presses against a stop in its closed position, the inner area of the filler neck part can be subject to quite significant soiling, in particular when traveling on dusty roads and streets. Dust and moisture can thus penetrate into the interior of the recess body. However, soiling in the area of the fuel filler neck is not undesirable solely because of required cleaning. Rather, in the event of a particularly high degree of soiling of the recess body, dirt particles can no longer be prevented from entering the fuel tank during refueling, for example.

It is therefore at least one object to provide an improved tank flap module, which has less tendency toward soiling and in particular is more dirt-resistant than known tank flap modules when traveling on dirty roads or even dusty tracks. The tank flap module is also to be distinguished by a construction which is cost-effective to produce and is simple to handle during installation. The tank flap module is further to be designed for a push-push closure mechanism, which is to allow opening and closing of the tank flap solely using mechanical means. In addition, other objects, desirable features and characteristics will become apparent from the subsequent summary and detailed description, and the appended claims, taken in conjunction with the accompanying drawings and this background.

SUMMARY

A tank flap module is provided for installation in a motor vehicle, it has a recess body insertable into an opening of the vehicle body. The recess body has a fastening edge formed like a flange which protrudes radially outward, using which the recess body is supported on an opening provided for this purpose upon reaching its final installation position on the vehicle body. Furthermore, the recess body, which is preferably insertable into the vehicle body outer plate, has a passage opening for receiving a fuel filler neck in the area of a base section which comes to rest in the vehicle interior. The recess body is preferably constructed from two components. It has a pot part comprising the fastening edge and a base section oriented toward the vehicle interior.

The tank flap module or the recess body thereof is distinguished by a peripheral axial sealing tab which extends along the fastening edge and is flexibly deformable. The sealing tab or sealing lip extends outward in relation to the installation location on the vehicle. It preferably extends essentially parallel to the axial direction of the fuel filler neck insertable into the passage opening of the base section.

The tab or lip is implemented such that it comes into contact on an inner side of a tank flap, which is located in the closed position and is mounted so it is pivotable on the recess body. Because the sealing tab is peripherally formed and completely encloses the recess body in the peripheral direction, a peripheral seal can therefore be formed on the inner side of the tank flap, which essentially prevents, or at least reduces, penetration of dust, dirt, and moisture into the interior of the recess body when the tank flap is closed.

The peripheral and flexibly deformable sealing tab is preferably supported in the closed position of the flap on the inner side of the tank flap and/or a vehicle body panel of the tank flap. Its geometric design is selected such that it yields at least far enough under the action of an inwardly directed application of pressure to the tank flap that the locking mechanism of the tank flap module, which is preferably implemented as a push-push closure, can be transferred into its open configuration. The axial sealing tab therefore has a flexibility and geometry such that it allows an at least slight, inwardly directed overpressure of the tank flap sufficient for opening the tank flap.

According to a first embodiment of the invention, it is therefore provided that the axial sealing tab is deformable such that the tank flap, starting from its closed position, is transferable into an unlocked position, which is oriented toward the vehicle interior, of a mechanical flap opening mechanism of the tank flap. The sealing tab allows a movement oriented toward the vehicle center of up to approximately 10 mm, preferably approximately 2 to approximately 8 mm, more preferably approximately 3 to approximately 6 mm, and even more preferably at least approximately 3 mm on an area of the flap opposite to the pivot axis.

The extension of the sealing tab is not necessarily perpendicular to the plane of the tank flap or its vehicle body panel. For example, it can also extend slightly diagonally to the axial direction predefined by the passage opening and/or to the surface normal of the tank flap and/or the vehicle body panel. It can also be provided that the sealing tab has an at least slightly curved or buckled extension in cross-section, which promotes targeted elastic deformation of the sealing tab under action of pressure acting via the flap. Furthermore, it is conceivable that the axial sealing tab is provided at spots and/or peripherally with a weakened line and/or weakened sections, which promote intended bending over and mechanical deformation of the sealing tab.

According to a further embodiment, it is provided that the axial sealing tab presses against the tank flap in a dust-tight and/or watertight manner as soon as the tank flap has assumed its closed position. A sealing mutual contact of axial sealing tab and a vehicle body panel on the tank flap side is particularly provided, which runs essentially flush with the surface of the outer vehicle body panel in the closed position of the tank flap and in the installed position on the vehicle.

According to a further embodiment, the fastening edge of the recess body is further enclosed in the radial direction by a radial sealing element. The radial sealing element encloses the fastening edge of the recess body in the peripheral direction. It can also overlap and/or encompass the edge like a bead in cross-section, so that the recess body is supported via the fastening edge and the sealing element situated thereon on the corresponding vehicle body opening upon reaching the installed location on the motor vehicle body.

Furthermore, it is provided according to an embodiment that the axial sealing tab and the radial sealing element are integrally formed. The axial sealing tab and the radial sealing element are preferably manufactured from the same material and can be fastened in the same manufacturing process on the recess body, in particular on the fastening edge thereof.

According to a further embodiment, it is provided that the axial sealing tab and the radial sealing element form a peripheral sealing lip, which has a C-shaped or L-shaped cross-sectional profile. One of the legs of the C profile or L profile forms the axial sealing tab and/or the radial sealing element in each case.

The sealing element, which protrudes radially outward, presses against the edge of the vehicle body opening to form a seal upon reaching the final installation configuration of the tank flap module on the motor vehicle. The vehicle body opening preferably has a flange-like fastening edge offset radially inward for this purpose, on which the flange-like outwardly protruding fastening edge of the recess body having the radial external sealing element is supported or with which it comes into contact.

Furthermore, it is provided that the recess body and the axial sealing tab and/or the radial sealing element are formed as a two-component or multicomponent plastic injection-molded part. It is particularly provided that the sealing lid comprising the sealing tab and the sealing element can be connected to the recess body in the course of a single injection-molding process. In this way, a separate installation process for the axial sealing tab or for the radial sealing element can advantageously be dispensed with. Through corresponding design of the injection mold, a predefined geometry and dimensional accuracy can be implemented in a cost-effective manner in an industrial mass production process.

Furthermore, it is provided that the axial sealing tab and the radial sealing element, and therefore the corresponding peripheral sealing lip encompassing the fastening edge of the recess body or the pot part, have a comparatively soft and/or elastically deformable plastic material in relation to the recess body. The recess body itself is preferably also manufactured in the course of a plastic injection-molding method. It can particularly be provided that at least the fastening edge of the recess body and/or the pot part thereof comprises a comparatively hard and dimensionally-stable plastic, such as polypropylene, and the sealing lip, or the individual components thereof, namely the axial sealing tab and/or the radial sealing element, comprise a comparatively soft and deformable thermoplastic plastic.

In this way, on the one hand, a sufficient structural stiffness can be provided for the recess body, in particular for the pot part thereof, while, on the other hand, this sealing lip has a sufficient elasticity for its intended purpose. In particular a natural or synthetic rubber comes into consideration for the thermoplastic plastic, such as an ethylene-propylene-diene rubber or a styrene-butadiene rubber.

Furthermore, it is provided according to a further embodiment that the base section or the base skirt of the recess body is also manufactured from the same plastic material as the sealing lip, so that the base section and the sealing lip having the axial sealing tab and the radial sealing element are connectable in the course of a single plastic injection-molding process to the pot part of the recess body, which is formed from a comparatively hard plastic.

In addition to the tank flap module, an additional embodiment further relates to a motor vehicle, in particular a passenger automobile, which has an above-described tank flap module.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
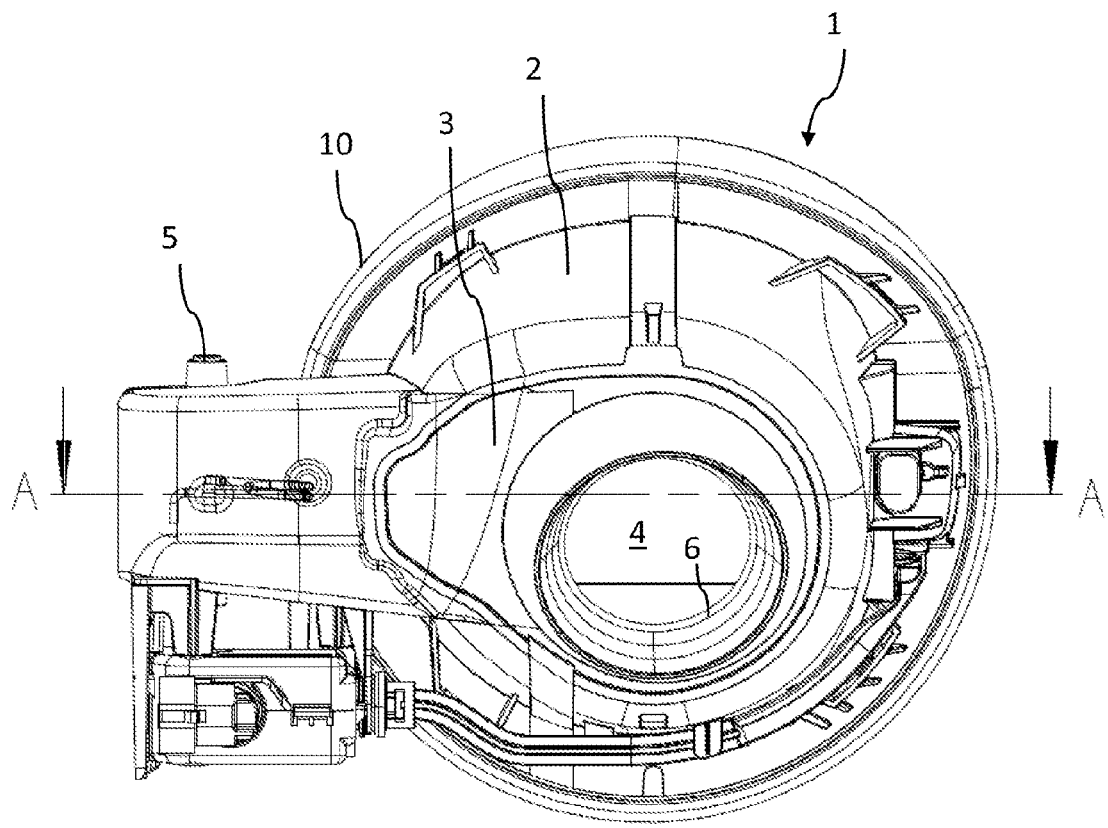
FIG. 1 shows a top view of the tank flap module viewed from the vehicle interior.

The tank flap module 1 shown in a top view in FIG. 1 is constructed from multiple components and has a recess body. The recess body itself is constructed from two components and has a pot part 2 made of a comparatively hard plastic and a base section 3 formed from a comparatively soft plastic on the upper motor vehicle outer side in FIG. 2.

While the pot part 2 has a peripheral fastening edge 15 protruding radially outward in the attachment area on the vehicle body 9, a passage opening 4 for a fuel filler neck is provided opposite thereto, facing toward the vehicle interior, in the base section 3.

The base section 3 is preferably manufactured from a thermoplastic plastic. It additionally has a geometry like a folded bellows in an edge area 6 adjoining the passage opening 4, which allows tolerance-compensating and vibration-damping mounting as well as fastening of the fuel filler neck (not explicitly shown in the figures)

Furthermore, a tank flap 8 which is pivotable around a pivot axis 5 is mounted on the pot part 2.

Figure 2:
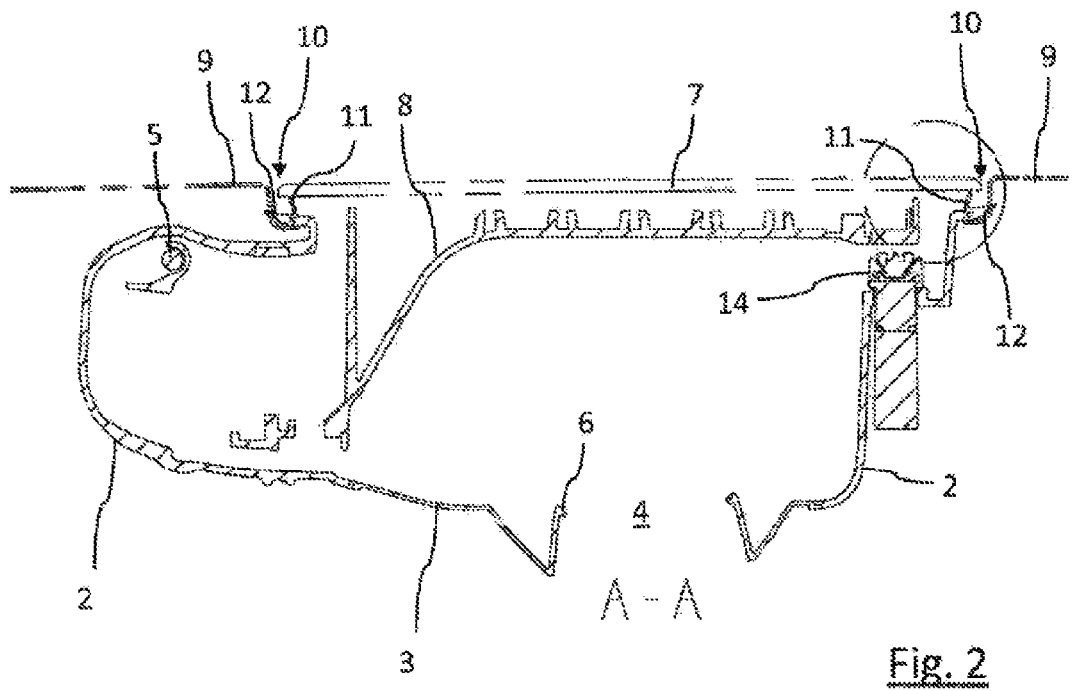
FIG. 2 shows a cross-section to the tank flap module according to FIG. 1 along section line A-A.

In the closed position shown in cross-section in FIG. 2, a vehicle body panel 7 situated externally on the tank flap 8 is situated essentially flush with the surface of the adjoining vehicle body outer plate 9.

Figure 3:
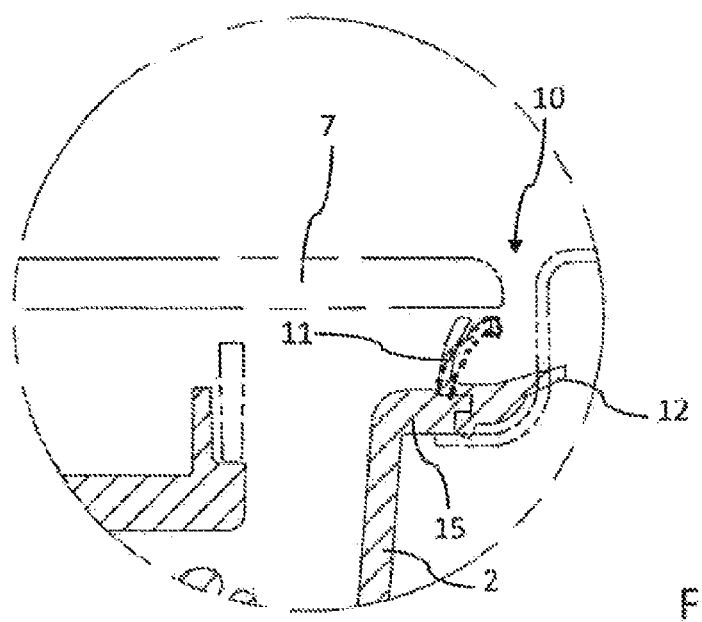
FIG. 3 shows an enlarged view of the sealing lip situated on the fastening edge of the recess body.

As may be seen from the enlarged view in FIG. 3, the fastening flange 15 of the pot part 2 of the recess body, which protrudes radially outward, is enclosed by a peripheral sealing lip 10. The sealing lip 10 has two sealing elements pointing in different directions, namely a radially outer sealing element 12 supported on the vehicle body plate 9, and a sealing tab 11 protruding axially outward.

While the radial sealing element 12 comes into contact with the vehicle body plate 9, the axial sealing tab 11 extending in the axial direction and essentially in the axial direction in the installed location on the motor vehicle forms a substantially dust-tight and/or moisture-tight seal, which cooperates with the interior of the vehicle body panel 7 of the tank flap 8. Due to its peripheral design, the axial sealing tab 11 provides a barrier for the penetration of dirt, dust, and moisture into the recess interior.

As is further illustrated on the basis of FIG. 3, the axial sealing tab 11 is implemented as thin-walled in comparison to the wall thickness of the pot part 2. The sealing tab 11 also has a slight curvature oriented radially outward, which supports a required flexibility of the tab 11 when the tank flap 8 is pressed inward beyond the closure position shown in FIG. 2.

In this way, in spite of the presence of a peripheral tab 11 supported on the inner side of the vehicle body panel 7, a mobility of the tank flap 8 inward, beyond the closure position, can be provided, so that the push-push closing mechanism (not explicitly shown) can be transferred into an open or released position by pressing down the tank flap 8 beyond the closure position shown in FIG. 2 and FIG. 3, from which the mechanism typically ensures that the tank flap 8 is automatically transferred into an at least partially open position, in which a user can reach behind the flap 8, or at least the vehicle body panel 7, and the flap 8 can be transferred into a fully open position.

Furthermore, the overpressure of the tank flap 7, 8, which is oriented downward in FIG. 2 and FIG. 3 and deforms the sealing tab 11, is limited by a stop 14 of the opening or closing mechanism or by a corresponding component 14 of the mechanism itself.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A tank flap module for installation in a motor vehicle, comprising:
   a recess body that is insertable into an opening of a vehicle body;
   a passage opening of the recess body that is configured to receive a fuel filler neck in an area of a base section;
   a flange-like fastening edge protruding radially outward away from the base section; and
   a flexibly deformable peripheral axial sealing tab pivotable on and extending axially outward from the flange-like fastening edge in relation to the passage opening and contacts an inner surface of a tank flap along its entire circumference while in a closed position.

2. The tank flap module according to claim 1, wherein the flexibly deformable peripheral axial sealing tab is deformable such that the tank flap is moveable from the closed position into an unlocked position, which is oriented toward a vehicle interior.

3. The tank flap module according to claim 1, wherein the flexibly deformable peripheral axial sealing tab presses dust-tight.

4. The tank flap module according to claim 1, wherein the flange-like fastening edge is enclosed in a radial direction by a radial sealing element.

5. The tank flap module according to claim 4, wherein the flexibly deformable peripheral axial sealing tab and the radial sealing elements are integrally formed.

6. The tank flap module according to claim 1, wherein the flexibly deformable peripheral axial sealing tab and a radial sealing element form a sealing lip having a C-shaped cross-sectional profile.

7. The tank flap module according to claim 4, wherein the radial sealing element presses against an edge of the vehicle body opening to form a seal in a final installed configuration on a vehicle.

8. The tank flap module according to claim 1, wherein the recess body and the flexibly deformable peripheral axial sealing tab are implemented as a multicomponent plastic injection-molded part.

9. The tank flap module according to claim 4, wherein the flexibly deformable peripheral axial sealing tab and the radial sealing element have a comparatively soft plastic material in relation to the recess body.

10. The tank flap module according to claim 1, wherein at least the flange-like fastening edge of the recess body comprises polypropylene.

11. The tank flap module according to claim 1, wherein the base section and the flexibly deformable peripheral axial sealing tab is manufactured from a plastic material and are connectable in a single plastic injection-molding process to the recess body.

12. The tank flap module according to claim 1, wherein the flexibly deformable peripheral axial sealing tab is configured to press water-tight against the tank flap.

13. The tank flap module according to claim 1, wherein the flexibly deformable peripheral axial sealing tab and a radial sealing element form a sealing lip having an L-shaped cross-sectional profile.

14. The tank flap module according to claim 1, wherein the recess body and a radial sealing element are implemented as a multicomponent plastic injection-molded part.

15. The tank flap module according to claim 4, wherein the flexibly deformable peripheral axial sealing tab and the radial sealing element have a comparatively elastically deformable plastic material in relation to the recess body.

16. The tank flap module according to claim 1, wherein the flexibly deformable peripheral axial sealing tab comprises a thermoplastic plastic.

17. The tank flap module according to claim 16, wherein the thermoplastic plastic is an ethylene-propylene-diene rubber.

18. The tank flap module according to claim 1, wherein a radial sealing element comprises a thermoplastic plastic.

19. The tank flap module according to claim 18, wherein the thermoplastic plastic is an ethylene-propylene-diene rubber.

\* \* \* \* \*